July 7, 1959 H. A. FAVORS 2,894,131
ELECTRONIC SELECTIVE CIRCUIT OR THE LIKE
Filed July 18, 1955
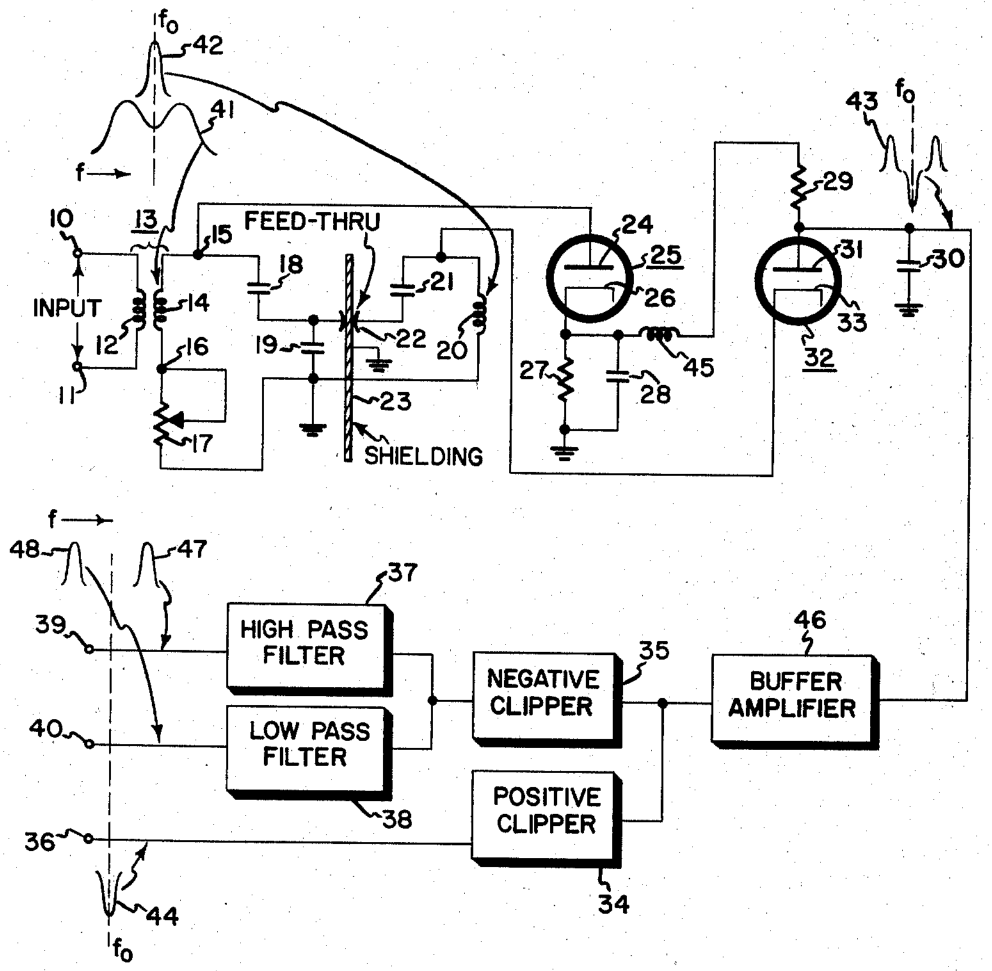
HOLLICE A. FAVORS
INVENTOR.
BY Bruce L. Birchard
HIS ATTORNEY 2,894,131
Patented July 7, 1959

2,894,131

ELECTRONIC SELECTIVE CIRCUIT OR THE LIKE

Hollice A. Favors, Tarzana, Calif., assignor to Hoffman Electronics Corporation, a corporation of California Application July 18, 1955, Serial No. 522,566

2 Claims. (Cl. 250—27)

This invention is related to selective circuits and, more particularly, to an improved electronic selective circuit which will exhibit versatility and a high degree of reliability.

In the past, there has arisen a need for an electronic selective circuit suitable for employment either as a band rejector circuit, a band-pass circuit, or an upper and/or lower side band selective circuit. The circuits thus far devised which are adaptable for several, distinct selective uses have exhibited rather cumbersome circuitry or have been characterized by unreliability in the presence of changing parameters, stray capacitance, and other such factors.

Therefore, it is an object of the present invention to provide a new and useful electronic selective circuit.

It is a further object of the present invention to provide a new and useful selective circuit which with a minimum of components will be adaptable for any one of several selectivity functions and yet exhibit a high degree of reliability.

According to the present invention, the inductive elements of a slightly over-coupled, double-tuned coupling circuit are connected, respectively, to positive output and negative output detectors. The outputs of the two detectors are combined to exhibit a composite output signal comprising modulation component excursions corresponding to carrier side bands and also a voltage of opposite polarity, either accompanied or unaccompanied by low frequency modulation components, corresponding to carrier amplitude. By employing clipping means and filtering means any desired frequency band may be selected. Means for varying the transformer coupling may be provided for adjusting the shape of the output response of the circuit, as desired.

The features of the present invention which are believed to be novel are set forth with particularity in the appended claims. The present invention, both as to its organization and manner of operation, together with further objects and advantages thereof, may best be understood by reference to the following description, taken in connection with the accompanying drawing, in which:

The sole figure is a schematic diagram partly in block form of an electronic selective circuit according to the present invention.

In the sole figure, terminals 10 and 11 are connected across primary winding 12 of transformer 13 and are adapted for coupling to a modulated carrier signal source (not shown). Secondary winding 14 of transformer 13 is connected between junction points 15 and 16. Junction point 16 is coupled through response adjustment 17 to a common reference potential. Junction point 15 is coupled through capacitors 18 and 19 to the common reference potential. Inductor 20 is coupled at one end to the common reference potential and at the other end through capacitor 21, insulated feed-thru 22, and capacitor 19 to the common reference potential. Feed-thru 22 is employed when it is desired to dispose shielding between secondary winding 14 and inductor 20 so as to reduce the possibility of inductive coupling therebetween. In such a case, the inter-disposed shielding, shielding 23, will be maintained at the common reference potential. Secondary winding 14 and inductor 20, in combination with capacitors 18, 19, and 21, constitute a double-tuned coupling circuit with low-side capacitive coupling being utilized therein, as is illustrated by the employment of capacitor 19, the value of which capacitor regulates the coefficient of coupling. Low-side coupling is employed, preferably, in order that the tuned circuits of the coupling circuit shall be coupled at the low impedance point to minimize the effects of stray pick-up. The coupling between the circuits of winding 14 and winding 20 may be varied as desired by appropriately adjusting response adjustment 17, thereby merely de-Qing the resonant circuit including winding 14. Anode 24 of diode 25 is connected to junction point 15. Cathode 26 of diode 25 is coupled to the common reference potential through the parallel circuit comprising resistor 27 and capacitor 28. The time constant of resistor 27 and capacitor 28 will be long in comparison with the resonant frequency of the double-tuned coupling circuit, but short in comparison with the modulation components of the input carrier. This is likewise true with reference to resistor 29 and capacitor 30 which are connected between anode 31 of diode tube 32 and cathode 26 of diode tube 25, through choke coil 45, and between anode 31 and the common reference potential, respectively. Cathode 33 of diode tube 32 is directly connected to the junction of winding 20 and capacitor 21. The output signal from diodes 25 and 32 is taken from anode 31 and is transmitted through buffer amplifier 46 to positive and negative clippers 34 and 35 simultaneously. The output signal from positive clipper 34 is taken directly from output terminal 36. The double side-band output from negative clipper 35 may be taken directly from clipper 35 or the two side bands may be separated by high-pass and low-pass filters 37 and 38, respectively, and the output taken from output terminals 39 and 40, respectively.

The circuit shown in the sole figure operates as follows. Winding 12 of transformer 13 merely serves as a means for inductively coupling the input modulated signal to the parallel resonant circuit of which winding 14 is a part. The parallel resonant circuits associated with winding 14 and inductor 20 are capacitively coupled by means of common, low-side coupling capacitor 19. While other types of coupling might reasonably be employed, it is believed that low-side coupling is to be preferred for the reason that, in addition to the reason heretofore given, the coupling capacitor may also be chosen quite large, thereby avoiding the effects of stray capacitance which might otherwise change the coupling were a capacitor of lower value employed in, for example, top-side coupling. Again, response adjustment 17 provides an easy adjustment for varying the transformer response merely by de-"Q"ing the primary circuit. As has been pointed out, shielding 23 may be employed between the two parallel resonant circuits so as to avoid all possibility of inductive coupling between winding 14 and inductor 20. The capacitance of feed-thru 22 relative to ground will only be of the order of a few micromicrofarads which, being in parallel with capacitor 19, will not seriously alter the coupling coefficient of the parallel resonant circuits. Assuming that the Q's of winding 14 and inductor 20 are substantially identical and the value of the coupling coefficient between the two resonant circuits is such that the two circuits are slightly over-coupled, then the response curve of winding 14 will be similar to curve 41 whereas curve 42 will be a representative response curve for inductor 20. Slight increases in the coupling coefficient will not alter seriously the uniformly concave central portion of curve 42. Representative of detectors which may be employed with the double-tuned coupling circuitry are diode tube stages 25 and 32 and the circuit components associated therewith. As is shown, anode 24 of diode 25 is directly connected to the tuned circuit of which winding 14 comprises a component part. Positive modulation excursions are detected by diode tube 25 and are passed to the output circuit of diode 32 whereas the carrier is largely filtered out by the combination of choke 45, resistor 27 and capacitor 28. It is to be noted that, by virtue of the dip in the response curve exhibited by winding 14, detection in the neighborhood of the resonant frequency ($f_0$) of the coupling circuit will be at a minimum. Voltage excursions of negative polarity appearing across inductor 20 will be detected by diode 32 and the detected voltage will appear across output load resistor 29. Carrier components will be filtered out by capacitor 30. Again, by virtue of the response curve of inductor 20, the detection of negative excursions will be greatest when the voltage applied to diode detector 32 is at the resonant frequency of the coupling circuit. Hence, the complete output signal voltage at anode 31 of diode 32 will be a composite of a negative signal voltage representing nominal carrier amplitude (either accompanied or unaccompanied by the very low frequency modulation components), a positive signal voltage representing signal amplitude excursions corresponding to the amplitude excursions of the lower side bands of the input signal, and a positive signal voltage representing signal amplitude excursions corresponding to the amplitude excursions of the upper side bands of the input signal.

To prevent the loading down of diodes 25 and 32 by the subsequent positive and negative diode clippers 34 and 35, a buffer amplifier 46 may be disposed between the last diode detector and the clipper stages. If signal voltages corresponding to the amplitudes of the upper and lower side band frequencies are to be rejected and the signal voltages corresponding to the center frequencies preserved, then positive clipper 34 will remove the positive side band modulation frequencies and preserve intact negative excursions of the center frequency modulation components. In such a case, the output would be taken from terminal 36. If, instead, the modulation components corresponding to the upper and lower side bands are to be preserved, then high-pass filter 37 and low-pass filter 38 may be employed as shown. Transmission of modulation components, corresponding to one side band, along to the circuitry which follows may be accomplished, of course, by the deletion of the non-associated filter. Or, if desired, modulation components corresponding to all three bands of frequencies may be preserved and transmitted to succeeding stages by the employment of both clippers and both filters.

In addition to other uses, the present circuit is ideally suited for employment in radio receivers which may utilize a comparatively wide-band I–F strip immediately preceding the present circuit without disturbing high selectivity of the receiver as contributed by this circuit.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In combination: a transformer having a primary winding and a secondary winding, said primary winding being adapted for coupling to a modulated carrier signal source; a first parallel resonant circuit including an inductor and first and second series capacitors in shunt with respect to said inductor; a second parallel resonant circuit including said secondary winding, and said first capacitor and a third capacitor in series with respect to each other and in shunt with respect to said secondary winding; said first and second resonant circuits being tuned to the frequency of said carrier signal and electromagnetically isolated from each other, said first resonant circuit being resonant within a central frequency band symmetrical about the frequency of said carrier; said first and second parallel resonant circuits being slightly over-coupled whereby said second resonant circuit is resonant within side frequency bands above and below said central frequency band; a first detector coupled to said first resonant circuit for detecting and exhibiting as an output signal modulation component excursions of one polarity within said central frequency band; a second detector coupled to said second resonant circuit for detecting and exhibiting as an output signal modulation component excursions of opposite polarity within said side frequency bands; and output circuit means coupled to said first and second detectors for exhibiting a composite output signal comprising the modulation component excursions of a plurality of said frequency bands.

2. In combination, a transformer having a primary winding and a secondary winding, said primary winding being adapted for coupling to a modulated carrier signal source, first and second capacitively coupled parallel resonant circuits tuned to the frequency of said carrier signal, a magnetic shield interposed between said parallel resonant circuits, said first resonant circuit being resonant within a central frequency band symmetrical about the frequency of said carrier, said second resonant circuit including said secondary winding, said first and second parallel resonant circuits being slightly over-coupled whereby said second resonant circuit is resonant within side frequency bands above and below said central frequency band, a first detector coupled to said first resonant circuit for detecting and exhibiting as an output signal modulation component excursions of one polarity within said central frequency band, a second detector coupled to said second resonant circuit for detecting and exhibiting as an output signal modulation component excursions of opposite polarity within said side frequency bands, and output circuit means coupled to said first and second detectors for exhibiting a composite output signal comprising the modulation component excursions of a plurality of said frequency bands.

References Cited in the file of this patent

UNITED STATES PATENTS

| | | |
|---|---|---|
| 2,148,578 | Pullis | Feb. 28, 1939 |
| 2,299,945 | Wendt | Oct. 27, 1942 |
| 2,326,737 | Andrews | Aug. 17, 1943 |
| 2,489,248 | Abraham | Nov. 29, 1949 |
| 2,526,266 | O'Brien | Oct. 17, 1950 |
| 2,589,236 | Earp | Mar. 18, 1952 |
| 2,611,081 | Spencer | Sept. 16, 1952 |
| 2,652,486 | Guyton | Sept. 15, 1953 |
| 2,677,122 | Gardner | Apr. 27, 1954 |
| 2,771,552 | Lynch | Nov. 20, 1956 |
| 2,773,181 | Singel | Dec. 4, 1956 |